United States Patent [19]

Gerow et al.

[11] 3,770,566

[45] Nov. 6, 1973

[54] INTERDIFFUSIONALLY BONDED STRUCTURES OF POLYIMIDE AND FLUOROPOLYMER

[75] Inventors: Clare William Gerow, Richmond, Va.; John Joseph Sparapany, Allegany, N.Y.

[73] Assignee: E. I. du Pont de Nemours and Company, Wilmington, Del.

[22] Filed: June 8, 1971

[21] Appl. No.: 150,909

[52] U.S. Cl.. 161/189, 117/138.8 UA, 117/161 UF, 156/246, 161/227
[51] Int. Cl............................................. B32b 27/34
[58] Field of Search...................... 156/311; 161/189, 161/227; 260/96 R; 117/161 P, 138.8 UF, 132 CF, 138.8 UA

[56] References Cited

UNITED STATES PATENTS

| | | | |
|---|---|---|---|
| 3,179,614 | 4/1965 | Edwards | 117/138.8 UF X |
| 2,833,686 | 5/1958 | Sandt | 156/311 X |
| 2,946,763 | 7/1960 | Bro et al. | 260/96 R X |

Primary Examiner—Alfred L. Leavitt
Assistant Examiner—David A. Simmons
Attorney—Donald W. Huntley

[57] ABSTRACT

Laminar film structures comprising polyimide interdiffusionally bonded to FEP fluorocarbon and a process for the preparation of these laminates comprising coating an organic or aqueous dispersion of FEP fluorocarbon onto a polyamide acid film and subsequently heating to convert the coated polyamide acid to polyimide.

4 Claims, No Drawings

INTERDIFFUSIONALLY BONDED STRUCTURES OF POLYIMIDE AND FLUOROPOLYMER

BACKGROUND OF THE INVENTION

Multi-layered structures of polyimide and fluorocarbon films have previously been prepared for electrical insulating purposes. Previous structures of this type, however, have suffered from the lack of a completely satisfactory bonding system. Most known adhesives do not possess the high temperature stability of the principal components of such laminates, and the bonds formed by such adhesives deteriorate rapidly when subjected to elevated temperatures. Further, the preparation of laminates of these materials by direct bonding has previously involved costly procedures for pretreating the surfaces of one or both of the lamina. In the absence of such surface pretreatment, non-adhesive laminates of polyimide and fluorocarbon materials tend to separate when exposed to moist environments, thereby limiting their potential applications.

SUMMARY OF THE INVENTION

The instant invention provides laminar structures of polyimide material and FEP fluorocarbon material having excellent bond strength, even in moist environments, that are prepared without recourse to either adhesives per se or activation of the bonding surfaces by special treatment.

Specifically, there is provided a unitary laminar film structure comprising at least one layer of polyimide material interdiffusionally bonded to a layer of FEP fluoropolymer, wherein the polyimide material is characterized by the following repeating structural unit:

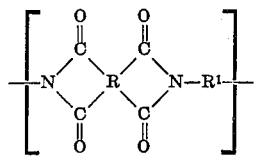

(1)

where R is selected from tetravalent aromatic organic radicals, including substituted derivatives thereof, having the following structural formulas:

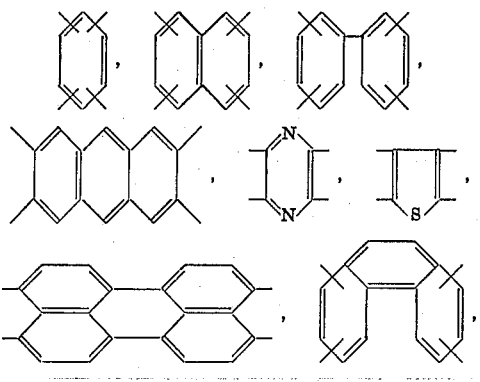

and

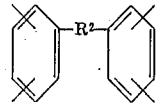

where $R^2$ is selected from alkylene of one to three carbon atoms, oxygen, sulfur, and radicals having the following structural formulas:

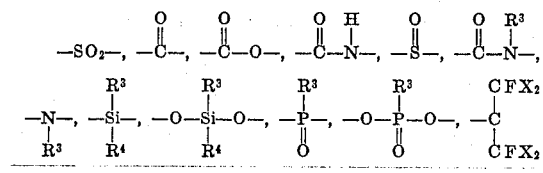

and

wherein $R^3$ and $R^4$ are selected from alkyl and aryl, and substituted groups thereof, and each X is separately chosen from the group consisting of F and Cl, the said R being such as obtained from a dianhydride of the formula

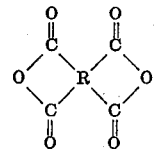

where R has the same meaning as above; and where $R^1$ is a divalent aromatic radical.

Preferably $R^1$ is selected from phenylene, naphthylene, biphenylene, anthrylene, furylene, benzfurylene, and

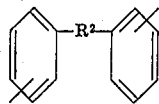

where $R^2$ is as defined above. The $R^1$ groups are conveniently derived from organic diamines having the formula $H_2N—R^1—NH_2$ where $R^1$ is as above defined.

There is further provided, according to the present invention, a process for making interdiffusionally bonded film structures of the above polyimides which comprises applying to at least one surface of a polyamide-acid gel film structure a coating composition selected from aqueous and organosol dispersions of FEP fluoropolymer and thereafter converting the polyamide acid gel film to a polyimide film structure.

DESCRIPTION OF THE PREFERRED EMBODIMENTS

The present invention provides a unitary film structure having multiple layers or strata interdiffusionally bonded together. The expressions "interdiffusional bonding," "interdiffusionally bonded" and similar terms means that the polymeric chains of the polymeric material constituting a layer or stratum of the unitary structure of the invention are diffused into the polymeric chains of the polymeric material constituting an adjacent layer or stratum of the unitary structure. For instance, in a representative embodiment of the unitary structure consisting of two layers or strata denominated for exemplary purposes as A and B, the polymeric chains of the polymeric material in layer A are diffused into the polymeric chains of the polymeric material in layer B, and vice versa, and the adhesion of the layers A and B together into a unitary shaped structure obtains without recourse to adhesives interposed between the contacting surfaces of layers A and B or subjecting the surfaces of either of layers A or B to adhesion promoting or activating treatments.

To obtain the bond strength required for most composites, it is necessary that the polymer chains be interdiffused to the extent that quantities of the polymeric material of each of the adjacent layers are present throughout an interface having a thickness of at least 25 angstroms.

The degree of the interdiffusion of the two adjacent lamina can be determined by one of several methods depending on the particular materials comprising the adjacent lamina. For example, thin cross sections of the laminate can be taken and microscopically examined. Alternatively, the surface of the laminate can be ground with potassium bromide and successive layers analyzed by means of infrared analysis. By this method, the analysis of the successive layers will illustrate the percentage of each polymer present at each layer of grinding.

The unitary film structures of the present invention are preferably about from 0.25 to 150 mils thick, and are characterized by interdiffusionally bonded layers of polyimide polymeric material of structural formula (1) hereinabove and FEP fluoropolymer. The polyimides can be obtained from polyamide-acid precursors which are obtained by reacting suitable diamines with suitable dianhydrides in the manner described in, for example, U. S. Pat. No. 3,179,614. Polyimides which can be used in the laminar structures of the present invention can be prepared from dianhydrides and diamines, as described in the above patent. Dianhydrides which can be used in such preparation include:

pyromellitic dianhydride;
3,4,9,10-perylene tetracarboxylic dianhydride;
naphthalene-2,3,6,7-tetracarboxylic dianhydride;
naphthalene-1,4,5,8-tetracarboxylic dianhydride;
bis(3,4-dicarboxyphenyl) ether dianhydride;
bis(3,4-dicarboxyphenyl) sulfone dianhydride;
3,4,3',4'-benzophenonetetracarboxylic dianhydride;
2,3,2',3'-benzophenonetetracarboxylic dianhydride;
bis(3,4-dicarboxyphenyl) sulfide dianhydride;
bis(3,4-dicarboxyphenyl) methane dianhydride;
2,2-bis(3,4-dicarboxyphenyl) propane dianhydride;
2,2-bis(3,4-dicarboxyphenyl) hexafluoropropane dianhydride;
3,4,3',4'-biphenyltetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
pyrazine-2,3,5,6-tetracarboxylic dianhydride;
benzene-1,2,3,4-tetracarboxylic dianhydride; and
thiophene-2,3,4,5-tetracarboxylic dianhydride.

Diamines which can be used together with dianhydrides in polyimide preparation include the following:
meta-phenylenediamine;
para-phenylenediamine;
2,2-bis(4-aminophenyl) propane;
4,4'-diaminodiphenylmethane;
4,4'-diaminodiphenyl sulfide;
4,4'-diaminodiphenyl sulfone;
3,3'-diaminodiphenyl sulfone;
4,4'-diaminodiphenyl ether;
2,6-diaminopyridine;
bis(3-aminophenyl) diethyl silane;
benzidine;
3,3'-dichlorobenzidine;
3,3'-dimethoxybenzidine;
4,4'-diaminobenzophenone;
N,N-bis(4-aminophenyl)-n-butylamine;
N,N-bis(4-aminophenyl) methylamine;
1,5-diaminonaphthalene;
3,3'-dimethyl-4,4'-diaminobiphenyl;
m-aminobenzoyl-p-aminoanilide;
4-aminophenyl-3-aminobenzoate;
N,N-bis(4-aminophenyl) aniline;
2,4-bis(beta-amino-t-butyl) toluene;
bis(p-beta-amino-t-butylphenyl) ether;
p-bis-2-(2-methyl-4-aminopentyl) benzene;
p-bis(1,1-dimethyl-5-aminopentyl) benzene;
m-xylylenediamine;
p-xylylenediamine;
position isomers of the above, etc., and mixtures thereof.

The preparation of polyimides and polyamide-acids is more fully described in U.S. Pat. No. 3,179,614 and U.S. Pat. No. 3,179,634.

Polyimide precursors, in addition to polyamide-acids, which can be used in the present invention include polyiminolactones described in U.S. Pat. No. 3,282,898; polyamide-acids described in U.S. Pat. No. 3,179,614; polyamide-esters described in U.S. Pat. Nos. 3,312,663; 3,316,211; 3,282,897; and 3,326,851; polyamide-amides described in U.S. Pat. No. 3,326,863, etc. These precursors can readily be converted to the polyimide as disclosed in the aforementioned patents.

The second essential layer of the laminates of the instant invention consists essentially of copolymer of tetrafluoroethylene and hexafluoropropylene, hereinafter designated FEP fluoropolymer. These copolymers are extensively described in U.S. Pat. Nos. 2,833,686, 2,946,763 and 3,051,683. The copolymer comprises about from 50 to 95 percent tetrafluoroethylene and about from 5 to 50 percent of hexafluoropropylene. Those copolymers wherein the amount of hexafluoropropylene is between about from 7 to 27 percent are preferred. Optionally, the fluorocarbon polymer layer can be blended with up to 95 percent by weight (based on the total weight of the two polymers) of a homopolymer of tetrafluoroethylene, such as that described in Berry in U.S. Pat. Nos. 2,559,750 and 2,559,752. The FEP fluorocarbon can be used as a dispersion in either an aqueous or an organic solvent medium. Aqueous dispersions of FEP fluorocarbons are commercially available under the trade name of "Teflon" fluorocarbon polymer dispersions. They are also described in the patents cited above. Dispersions in organic solvent media, also known as organosols, are described in copending applications Ser. No. 738,817 and 738,818, both filed on June 21, 1968, and of common assignee with this application.

According to the process of the present invention, an aqueous or organosol dispersion of FEP fluoropolymer is coated onto a polyamide acid gel film structure. This can be either a gel film structure per se or a solvated film structure of the polyimide precursor. The term "gel film" is used to mean a sheet of the polymeric material which is laden with volatiles, primarily solvent, to such an extent that the polymeric material is in a gel-swollen, plasticized, rubbery condition. The base gel film thickness generally falls in the range of 1.5–400 mils. The volatile content is usually in the range of 80–90 percent by weight and the polymer content usually in the range of 10–20 percent by weight of the gel film.

The gel film stage is that stage at which the film becomes self-supporting so that it can be stripped from the support on which it was cast and heated. The solvent content at which a given polymer will form a gel film depends to some extent on the amide-acid/imide ratio of the polymer, and on the structure of the polymer. By "polyamide-acid/imide" is meant a composition which is partially and incompletely cured, i.e., which is at an intermediate stage of curing from polyamide-acid to polyimide. For the purposes of this invention, this term will usually refer to compositions which have an amide-acid-to-imide ratio between 90:10 and 10:90.

The gel film structure can be prepared by the method described in U.S. Pat. No. 3,410,826 by mixing a chemical converting agent and a catalyst, such as a lower fatty acid anhydride and a tertiary amine, respectively, into a polyamide-acid solution at a low temperature, followed by casting the polyamide-acid solution in film form, on a casting drum and thereafter mildly heating the cast film at, for example, 100°C. to activate the conversion agent and catalyst for transforming the cast film to a polyamide-acid/imide gel film structure.

Another type of polyamide acid gel structure which can be used in the instant invention for coating with an FEP fluorocarbon dispersion to form an interdiffusional bond is a solvated polyamide acid film. By this term is meant a film which is all polyamide-acid or which has only a low polyimide content, of about from 0 to 25 percent, and which is about 50 to 75 percent by weight polymer and 25 to 50 percent by weight solvent. Such film is sufficiently strong to be self-supporting. Film in this composition range can be obtained in several ways.

One method of preparing solvated polyamide-acid film is to cast a polyamide-acid solution in some suitable solvent such as N,N-dimethylacetamide (DMAC) into film form on a suitable base such as a casting drum or belt, and then to remove solvent. Solvent can be removed by use of low pressure, by application of mild heat (up to about 150°C., but preferably no greater than about 100°C. ), by washing or extracting with a liquid which is a non-solvent for the polymer but miscible with the polyamide-acid solvent (such as acetone, benzene, etc.), or by a combination of these methods. When mild heat is used, a low proportion of the amide-acid units in the polymer, up to about 25 percent of them, may be cyclized to imide units. This amount of conversion in this type of base layer is not harmful, however, as the film may still be subsequently coated as described herein to give a laminar structure having an interdiffusional bond.

A second method of preparing solvated polyamide-acid film involves first precipitating a high-solids composition from a polyamide-acid solution by thoroughly mixing (for example, with a high-shear stirrer such as a Waring blender) with a low boiling liquid which is a non-solvent for the polymer but miscible with the polyamide-acid solvent, such as methylene chloride or petroleum ether. The precipitated polymer-containing phase is separated, and placed under vacuum to remove any of the low boiling liquid it may contain. The resulting mass will usually consist of about 50 to 75 percent by weight polymer solids and 25 to 50 percent by weight of the original solvent. After adding a small amount of additional polyamide-acid solvent, if necessary, to adjust the composition to about 50 to 65 percent solids with the aid of apparatus such as a rubber mill, the resulting tough gummy compositions may be pressed or calendered to tough films with the aid of mild heating, for example, at 100° to 110°C. This film can then be coated to give a laminar structure in accordance with this invention.

A third method of preparing solvated polyamide-acid film entails polymerization of the usual diamine and dianhydride at a 20 to 40 percent solids level in a medium which is a mixture of the typical good polyamide-acid solvent such as DMAC or N-methylcaprolactam and a low-boiling poor solvent or non-solvent such as methylene chloride or acetone, the amounts and proportion of the two types of solvent being chosen to result in a composition having about 50 to 75 percent solids after removal of the poor or non-solvent. Following completion of the polymerization, the low boiler is removed, for example, by milling the composition on a rubber mill at slightly elevated temperature such as 50° to 60°C. The resulting viscous gummy composition can be fabricated into film under pressure at elevated temperature, for example, in the range of 100° to 110°C. At this point, the resulting film is generally heated in the range of 50° to 100°C. to remove whatever low-boiling solvent may have remained in the composition. The resulting film can then be coated to give a laminar structure in accordance with this invention.

In accordance with the process of the present invention, the polyamide acid gel film is coated with a dispersion of FEP fluorocarbon. Application of the dispersion can be accomplished in any number of ways, such as dipping or kiss roll coating, followed by metering with a doctor knife, doctor rolls, squeeze rolls or air knife. It can also be applied by brushing or spraying. In general, the FEP fluoropolymer dispersion is applied in thicknesses that will result in a final FEP layer of at least 0.05 mil.

Immediately after coating the polyamide acid gel film with the dispersion, the polyamide acid can be converted to the cured polyimide film structure. The conversion can be effected by any convenient method, including both chemical and thermal means. The use of chemical conversion agents and catalysts, and materials suitable for this purpose, are described, in U. S. Pat. Nos. 3,179,630 and 3,179,632. Thermal conversion is described in U. S. Pat. No. 3,179,634.

The conversion of the coated base film to interdiffusionally bonded polyimide film structure can be accomplished without maintaining the base film under restraint. It is preferred, however, to restrain the coated base film during conversion by using a tenter frame in order to prevent excessive film shrinkage in the transverse direction and in order to prevent wrinkling so that a flat, smooth interdiffusionally bonded laminar film is obtained.

The improved products of the present invention can be used in those applications in which a polyimide-fluoropolymer laminate has previously found utility. However, the laminates of the instant invention exhibit markedly improved bonding strength on exposure to water or high humidity, without the benefit of an adhesive interlayer or sophisticated priming treatments for the bonded surface.

The present invention is further illustrated by the following specific examples.

EXAMPLES 1-2

A base gel film of polyamide-acid/imide based on pyromellitic dianhydride and 4,4'-diaminodiphenyl ether was prepared by adding slowly in portions 2,180 gms. (10 mols) of pyromellitic dianhydride (PMDA) to a solution of 2,000 gms. (10 mols) of 4,4'-diaminodiphenyl ether (DDE) in 23,690 gms. of N,N-dimethylacetamide (DMAC) maintained at a temperature below 60°C. The resulting 15 percent solids solution of the polyamide-acid was cooled to 0°C., and while maintained at this temperature, 4,080 gms. (40 mols) of acetic anhydride and 1,860 gms. (20 mols) of beta-picoline were added. The resulting composition was cast onto a drum heated at 100°C. in film form having a thickness of about 10 mils (which results in a nominal dry polyimide film thickness of 1 mil). The cast film was held on the drum for about 10 seconds, after which it was stripped from the drum as a self-supporting gel polyamide-acid/imide film.

Two FEP organosols were prepared. The first was prepared in a 2-gallon ball mill into which were placed 1,500 g. of tetrafluoroethylene/hexafluoropropylene (85:15) copolymer flake which had previously been washed in water and dried (hereinafter FEP), 2,900 g. of methyl isobutyl ketone (MIBK), 100 g. of Polymer Solution A, and 1 gallon of flint pebbles.

Polymer Solution A had been prepared by charging into a reaction flask 356.9 g. of toluene, 110 g. of acetone, 320.7 g. of methyl methacrylate, 16.9 g. of 3-(beta-methacryloxyethyl)-2,2-spirocyclohexyloxazolidine, and 1.69 g. of 2,2-azo-bis-isobutyronitrile (hereinafter ABI), and the mixture heated at reflux for about ten hours. During the refluxing, 0.35 g. of ABI in 6 g. toluene and 2 g. acetone was added at the end of 4 hours, 0.04 g. of ABI in 0.6 g. toluene and 0.2 g. acetone at the end of 6 hours, and 0.03 g. of ABI in 0.6 g. toluene and 0.2 g. acetone at the end of 7 hours.

The ball mill was run for 17 hours, and the resulting organosol was poured off. 1,600 g. of MIBK was then added to the mill, the mill was run for 3 hours, and this rinsing was combined with the organosol and blended into it to provide an organosol containing 24.6 percent FEP.

The second organosol was similarly prepared, using a 1-gallon ball mill into which were placed 750 g. of FEP, 1,450 g. of MIBK, 50 g. of Polymer Solution A, and 2 quarts of flint pebbles, and the mill was run for 17 hours. The resulting organosol was poured off, 200 g. of MIBK was added to the mill, and the mill was run for 3 hours. This rinsing was combined with the organosol and blended to provide an organosol containing 30.5 percent by weight FEP. To 995 g. of this organosol was added 1,025 g. of N,N-dimethylacetamide (DMAC) and the mixture was thoroughly blended to provide an organosol containing 15 percent by weight FEP.

In Examples 1 and 2, respectively, the first and second organosols were coated on samples of the polyamide-acid/imide gel film with a brush. The coated films were first dried at an air temperature of 130°C. for 4 minutes, and then at 400°C. for 5 minutes. The coated sides of specimens of each film were heat sealed together at a temperature of 350°C. and a pressure of 20 psi for 30 seconds. Some of the sealed specimens were tested for seal strength immediately, others after being subjected to boiling water for various periods, and still others after being subjected to the humidity cycling test for various periods. These samples were compared to a control sample prepared by coating an aqueous FEP dispersion onto a cured polyimide film. The resulting peel strengths in grams/inch are summarized in Table I.

TABLE I

| Example | 1 | 2 | Control |
|---|---|---|---|
| Initial peel strength | 1382 | 1517 | 1020 |
| After boiling in water | | | |
| 1 hour | 1365 | 1321 | 290 |
| 2.5 hours | 796 | 1125 | 180 |
| 4 hours | 607 | 965 | 70 |
| After humidity cycling | | | |
| for 2 days | 1040 | 1173 | — |
| 5 days | 656 | 996 | 350 |
| 9 days | 310 | 645 | 180 |
| 12 days | 215 | 516 | |

EXAMPLES 3-6

An aqueous dispersion of FEP was prepared containing 20 percent by weight of FEP and 0.1 percent by weight "Carbopol" 960 hydrophilic colloid, and then coated onto one side of a self-supporting gel film prepared as in Examples 1-2. The dispersion was applied by spraying, using dichlorodifluoromethane propellant. The film was pinned to a tenter frame, and dired by passing through an oven 80 inches long. The drying conditions of the coated film of Examples 3, 4, 5 and 6 were varied as shown in Table II.

TABLE II

| Example | Air temperature (°C.) | Film speed (feet/minute) |
|---|---|---|
| 3 | 157 | 5 |
| 4 | 165 | 12 |
| 5 | 170 | 20 |
| 6 | 175 | 30 |

Specimens of each product were heat sealed, coated side to coated side, under the same conditions as in Example 1-2. Some of the sealed specimens were tested immediately, others after being subjected to boiling water or humidity cycling for various periods. The films were compared with a control sample prepared by coating an aqueous FEP dispersion onto a cured polyimide film. The resulting peel strengths in grams/inch are summarized in Table III.

TABLE III

| Example | 3 | 4 | 5 | 6 | Control |
|---|---|---|---|---|---|
| Initial peel strength | 1420 | 1278 | 993 | 571 | 1020 |
| After boiling in water | | | | | |
| 1 hour | 1133 | 815 | 565 | 378 | 290 |
| 3 hours | 935 | 572 | 422 | 218 | — |
| 4 hours | 775 | 523 | 402 | 247 | 70 |
| After humidity cycling | | | | | |
| for 2 days | 988 | 633 | 543 | 258 | — |
| 7 days | 615 | 365 | 260 | 192 | — |
| 11 days | 500 | 312 | 270 | — | — |
| 15 days | 458 | 293 | 250 | — | 100 |

EXAMPLES 7–8

Lengths of gel film as prepared in Examples 1–2 were pinned to a tenter frame and were coated on one side with an aqueous dispersion of FEP containing 20 percent by weight of FEP and 0.1 percent by weight of "Carbopol" 960, by spraying with dichlorodifluoromethane propellant. The films of Examples 7 and 8 were given one spray coating pass and two spray coating passes, respectively. The films were then passed through an oven having an air temperature of 190°C. for 10 minutes. Specimens of each product were heat sealed, (350°C., 20 psi., 30 seconds), coated side to coated side. Some of the sealed specimens were tested immediately, others after being subjected to boiling water or humidity cycling for various periods. The results are summarized in Table IV.

TABLE IV

| Example | (peel strength in grams/inch) | |
|---|---|---|
| | 7 | 8 |
| Initial peel strength | 1123 | 1578 |
| After boiling in water | | |
| 1 hour | 928 | 1248 |
| 3 hours | 785 | 842 |
| 4 hours | 652 | 713 |
| 5 hours | 636 | 563 |
| 6 hours | 610 | 490 |
| After humidity cycling for | | |
| 4 days | 476 | 667 |
| 8 days | 330 | 373 |
| 11 days | 200 | 180 |
| 15 days | 161 | 181 |

EXAMPLES 9–10

Lengths of gel film prepared as in Example 1 were coated on one side with aqueous dispersions of FEP. The dispersions of Examples 9 and 10, respectively, comprised 10 percent by weight FEP and 0.05 percent by weight "Carbopol" 960; and 5 percent by weight FEP and 0.025 percent by weight "Carbopol" 960. The coatings were applied by spraying with dichlorodifluoromethane propellant. The films were pinned to a tenter frame, and were passed through an oven at an air temperature of 180°C. for 13.5 minutes. Specimens of each product were heat sealed as in Examples 7–8 and subjected to various periods of humidity cycling. The resulting peel strengths, in grams/inch, are summarized in Table V.

TABLE V

| Example | 9 | 10 |
|---|---|---|
| Initial peel strength | 1143 | 778 |
| After humidity cycling for | | |
| 3 days | 996 | 626 |
| 6 days | 640 | 563 |
| 10 days | 613 | 623 |
| 17 days | 317 | 435 |

EXAMPLES 11–12

Polymer Solution B was prepared by refluxing a mixture of 720 g. of toluene and 80 g. of acetone. Over a 3-hour period to this was added during reflux a mixture of 400 g. of methyl methacrylate, 16 g. of allyl methacrylate, 40 g. of aminoethyl vinyl ether, and 8 g. of 2,2-azo-bis-isobutyronitrile; during continued reflux over a 2-hour period was added a mixture of 417 g. of 2-ethylhexyl acrylate, 63.2 g. of acetone, and 10.1 g. of 2,2-azo-bis-isobutyronitrile. Heating under reflux was continued an additional half hour.

In Example 11, pieces of gel film as prepared in Example 1 were coated with an organosol prepared from 200 g. of FEP flake, 400 g. of DMAC, 100 g. of MIBK, and 20 g. of Polymer Solution B by milling in a ball mill for 66 hours.

In Example 12, pieces of gel film were coated with an organosol prepared from 840 g. of FEP flake, 1,440 g. of MIBK, and 60 g. of Polymer Solution B by milling in a ball mill for 66 hours.

The coated films were dried at 150°C. for 10 minutes, then at 300°C. for 10 minutes. Specimens of both films were heat sealed, and found to have heat seal strengths averaging 800 grams/inch.

We claim:

1. A unitary laminar film structure comprising at least one layer of polyimide material interdiffusionally bonded to a layer of FEP fluoropolymer, wherein the polyimide material is characterized by the following repeating structural unit.

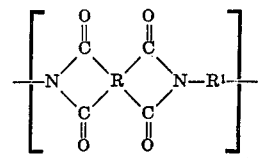
(1)

where R is selected from tetravalent aromatic organic radicals, including substituted derivatives thereof, having the following structural formulas:

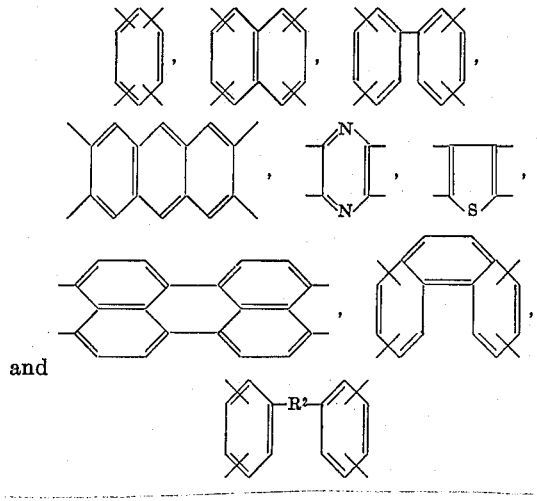

and where $R^2$ is selected from alkylene of one to three carbon atoms, oxygen, sulfur, and radicals having the following structural formulas:

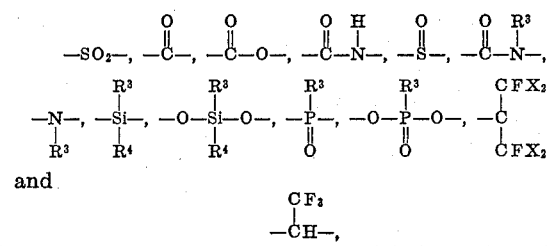

and wherein $R^3$ and $R^4$ are selected from alkyl and aryl, and substituted groups thereof, and each X is separately chosen from the group consisting of F and Cl, the said R being such as obtained from a dianhydride of the formula

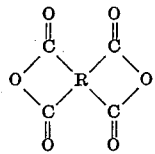

where R has the same meaning as above; and where $R^1$ is a divalent aromatic radical.

2. A film structure of claim 1 wherein R is selected from phenylene, naphthylene, biphenylene, anthrylene, furylene, benzfurylene, and

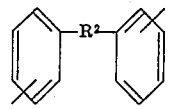

where $R^2$ is as defined above.

3. A laminar structure of claim 1 wherein the polymer chains of the FEP fluoropolymer and the polyimide are both interdiffused throughout an interface having a thickness of at least 25 angstroms.

4. A laminar structure of claim 1 wherein the FEP fluoropolymer layer has a thickness of at least about 0.05 mil.

* * * * *

UNITED STATES PATENT OFFICE
CERTIFICATE OF CORRECTION

Patent No. 3,770,566          Dated Nov. 6, 1973

Inventor(s) Clare William Gerow and John Joseph Sparapany

It is certified that error appears in the above-identified patent and that said Letters Patent are hereby corrected as shown below:

Column 10, line 63, "$\underset{\underset{\underset{CFX_2}{|}}{-C}}{CFX_2}$" should read -- $\underset{\underset{\underset{CFX_2}{|}}{-C-}}{CFX_2}$ --.

Signed and sealed this 18th day of June 1974.

(SEAL)
Attest:

EDWARD M. FLETCHER, JR.  
Attesting Officer

C. MARSHALL DANN  
Commissioner of Patents